Figure 1:
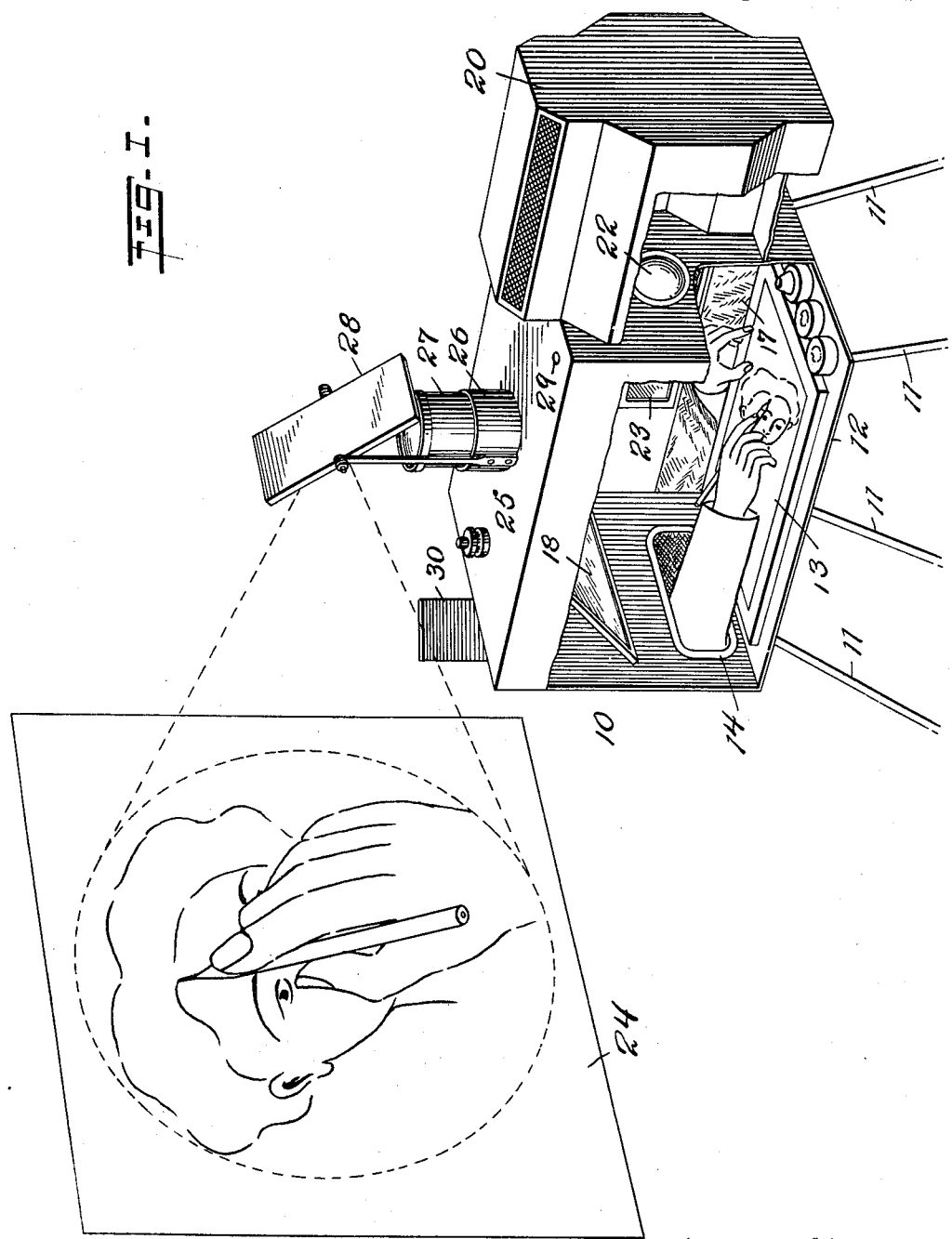

H. MAYER.
APPARATUS FOR PROJECTING PICTURES DURING PRODUCTION.
APPLICATION FILED NOV. 3, 1911.

1,036,131.

Patented Aug. 20, 1912.

2 SHEETS—SHEET 1.

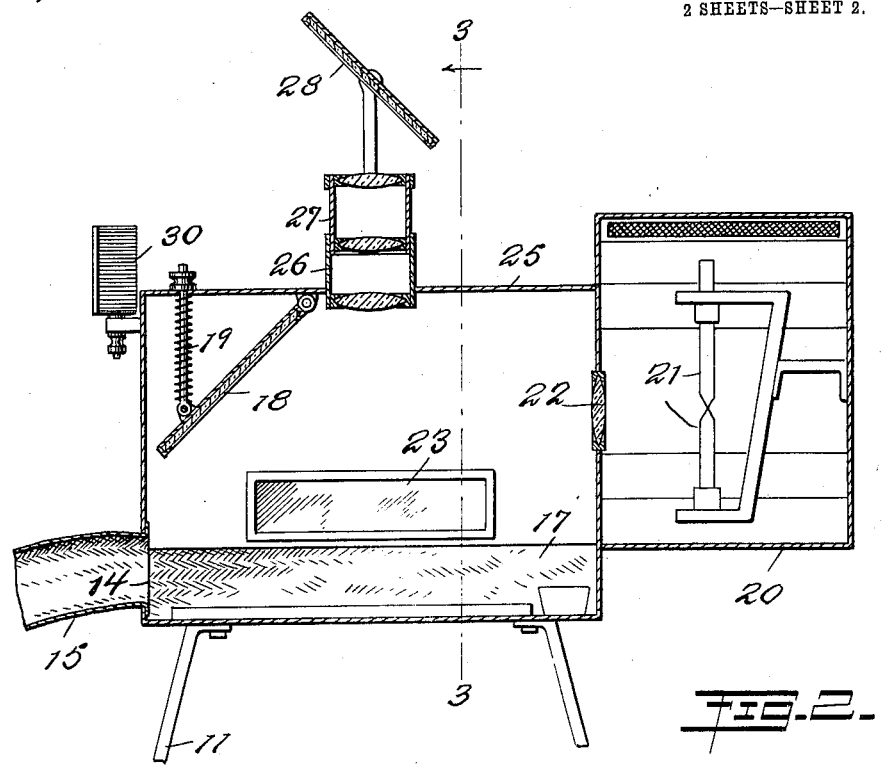
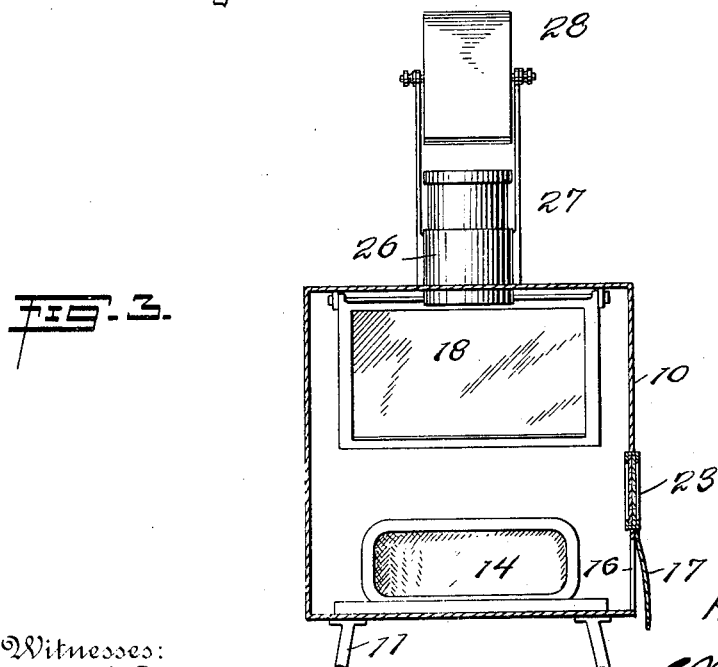

UNITED STATES PATENT OFFICE.

HENRY MAYER, OF NEW YORK, N. Y.

APPARATUS FOR PROJECTING PICTURES DURING PRODUCTION.

1,036,131.  Specification of Letters Patent.  Patented Aug. 20, 1912.

Application filed November 3, 1911. Serial No. 658,354.

*To all whom it may concern:*

Be it known that I, HENRY MAYER, a citizen of the United States, and a resident of the city of New York, borough of Manhattan, county and State of New York, have invented certain new and useful Improvements in Apparatus for Projecting Pictures During Production, of which the following is a full, clear, and exact description.

This invention relates to certain improvements in the projecting of pictures on to screens during the process of producing the picture and in such a manner as to show the hand and drawing instruments on an enlarged scale, making their necessary movements in producing the picture.

My invention is particularly useful in entertaining an audience or in illustrating or in teaching to them the art of drawing, sketching or painting. The apparatus is so constructed that not only the picture but also the hand and drawing instruments appear in all their natural colors, so that an audience or class may see what seems to be a gigantic hand, appear on the screen, pick up the pencil, pen or brush and proceed to sketch or paint the picture. The parts are not shown merely in relief, but appear in natural colors in all respects.

Reference is to be had to the accompanying drawings, which form a part of this specification and in which similar reference characters indicate corresponding parts in the different views.

Figure 1 is a perspective view of an apparatus constructed in accordance with my invention, a portion of the casing being broken away; Fig. 2 is a central longitudinal section; and Fig. 3 is a transverse section on the line 3—3 of Fig. 2.

My improved apparatus involves a casing 10 of suitable material, which is substantially fireproof and lightproof and sufficiently light to permit of its ready transportation. The casing is supported in any suitable manner as, for instance, upon legs 11 and at such a height that a person standing or sitting may insert his hands into the casing. The casing has a bottom or floor 12 upon which may be supported a drawing board and pad or a sheet of paper or canvas 13 or any suitable surface upon which the drawing or picture may be produced.

To enable the operator to gain access to the casing without admitting light, the casing has an opening 14 at one end with a fabric sleeve 15 connected thereto, so that the operator or artist may extend his hand into the sleeve and gather the outer end of the latter tightly about his arm. This opening 14 permits the insertion of the right hand and on an adjacent side has an opening 16 covered by a depending heavy flap 17 of opaque fabric and through which the fingers or a portion of the left hand may be inserted to hold the paper stationary or to adjust the pencils, pens, paint cups or the like. The flap falls down from the end, so that practically no light can escape from the cabinet to either openings 14 or 16.

Within the cabinet and at the end having the opening 14 is an inclined mirror 18 preferably hinged and supported by an adjustable rod 19, so that its inclination may be varied. At the end of the casing opposite to the mirror 18 is any suitable means for producing an extremely high degree of illumination within the casing. As a practical device for securing this result, I employ an arc light mounted in a separate casing 20 and having the carbons 21 so positioned that the intense light produced may be projected through a lens 22 on to the mirror 18 and thus down on to the paper upon which the artist is producing the picture. The casing 20 of the arc light is substantially lightproof, although it may have ventilating openings in the upper end. I do not claim any improvement whatsoever in the arc light and have not illustrated any of the details of wiring, adjustment of carbons or any other features essential to arc lights. It is, of course, understood that the necessary details of this part can be readily produced by any electrician familiar with electro-arc lights.

In order to enable the artist to see what he is producing upon the paper or canvas 13, I provide a window 23 in the side of the casing directly above the opening 16. This window is formed of one or more thicknesses of colored glass, the color and thickness being such that they will protect the eyes of the artist from the extremely high illumination or glare within the casing and at the same time will not permit the illumination of objects outside of the casing if the device be used in a dark room, as it ordinarily would.

In order to obtain the best effect, the paper 13 is illuminated by the intense white light, but this light is retained within the casing by reason of a sleeve 15, the flap 17 and the colored window 23, except that part which is projected on to the screen.

The apparatus may be used in connection with any suitable form of screen, but I have illustrated a screen 24 of any suitable material and either opaque or translucent. If the screen be opaque, then the picture would be projected on to the same side as that viewed by the audience, while with a translucent screen an apparatus may be on one side and the audience on the other. For projecting the picture on to the screen, the top wall 25 of the casing is provided with a vertical tube including two telescoping sections 26 and 27 and within these sections are the proper lenses which will throw an image of the picture on to a mirror 28 supported above the top of the tube. This mirror is supported in any suitable manner and is inclined at approximately 45 degrees to the horizontal, so that the image which is thrown directly upward from the paper 13 will be reflected substantially at right angles against the screen. The hand, paper and drawing instruments come directly below the tube, so that the view which is thrown on to the screen is a top plan view of whatever is placed on the bottom of the casing.
This includes not only the hand, paper and drawing instruments, but also ink wells, oil tubes, paint cups, crayons and the like. The contents of the casing being illuminated with a bright, white light, the picture which is reflected on the image is in all the natural colors of the object itself, though on a much larger scale.

In using the device, the artist draws, sketches or paints a picture on the paper, and the audience sees the picture as it is being made, line for line.

The device is useful in the entertainment of audiences, the display or writing of advertisements or the instruction of classes in the art of drawing, sketching or painting. It may be perfected with various different attachments or refinements which do not go to the essence of the invention. For instance, the top wall of the casing may be provided with ventilating openings 29 to reduce the high temperature within the casing and the end wall may be provided with a pivotally supported mirror 30 in which the artist may look to see what is shown on the screen. The upper section of the tube may be adjusted vertically in any suitable manner to vary the focus of the picture.

Various changes may be made in the construction of the device illustrated without departing from the spirit of my invention.

Having thus described my invention, what I claim as new and desire to secure by Letters Patent is:

1. An apparatus of the character described, comprising a portable casing having a hand hole therein, means for highly illuminating the interior of said casing, means for preventing the escape of light from said casing through said hand hole upon the insertion of the hand into the casing, a lens supported by one wall of said casing and a mirror for reflecting the light rays, whereby there may be projected upon a screen an enlarged image of the hand within the casing.

2. An apparatus for projecting pictures comprising a portable casing, serving to support within the interior thereof a sheet of paper or the like in a substantially horizontal position and said casing having a hand hole in one side thereof whereby the hand may be inserted into the casing to sketch or otherwise produce a picture on said paper, means for highly illuminating the interior of the casing and means for reflecting an enlarged image of the hand and paper upon a screen outside of said casing.

3. An apparatus for projecting pictures comprising a casing serving to support a sheet of paper or the like within the interior thereof and having a hand hole whereby the hand may be inserted to sketch or otherwise produce a picture upon said paper, a colored window in said casing through which the artist outside of said casing may see the paper and hand within the casing and means for reflecting an enlarged image of the hand and picture upon a screen outside of said casing.

4. An apparatus of the class described, comprising a casing serving to support on the interior thereof a surface upon which a picture may be produced and said casing having hand holes in adjacent sides near said surface, a sleeve encircling one of said hand holes and serving to prevent the escape of light rays around the hand inserted through said hand hole, a flap covering the other hand hole and serving to prevent the escape of light rays, a colored window within one wall of said casing and means for projecting an enlarged image of the hand surface upon a screen outside of said casing.

5. An apparatus of the class described comprising a portable casing having an illuminating means adjacent one end thereof, an inclined mirror adjacent the opposite end thereof and serving to reflect light rays on to the bottom of said mirror, hand holes adjacent said bottom and through which the hand may be inserted to sketch or otherwise produce a picture upon said bottom, a lens supported by the top wall of said casing and an inclined mirror above said lens for reflecting laterally an image of the hand and bottom of the casing below said lens and last-mentioned mirror.

In testimony whereof I have signed my name to this specification in the presence of two subscribing witnesses.

HENRY MAYER.

Witnesses:
 JOHN D. SHAW,
 GASTON MAYER.